Jan. 11, 1949.   W. HOIER ET AL   2,458,597
MILLING MACHINE
Filed Sept. 15, 1943   9 Sheets-Sheet 4

INVENTOR.
Walter Hoier
Richard N. Clifton
BY Leigh W. Wright
ATTORNEY

Jan. 11, 1949.  W. HOIER ET AL  2,458,597
MILLING MACHINE
Filed Sept. 15, 1943  9 Sheets-Sheet 7

INVENTOR.
Walter Hoier
Richard N. Clifton
BY Leigh W. Wright.
ATTORNEY

Jan. 11, 1949.  W. HOIER ET AL  2,458,597
MILLING MACHINE
Filed Sept. 15, 1943  9 Sheets-Sheet 9

Fig. 15

INVENTOR.
Walter Hoier
Richard N. Clifton
BY Leigh W. Wright.
ATTORNEY

Patented Jan. 11, 1949

2,458,597

UNITED STATES PATENT OFFICE 2,458,597

MILLING MACHINE

Walter Hoier and Richard N. Clifton, Cincinnati, Ohio, assignors to The Cincinnati Milling Machine Co., Cincinnati, Ohio, a corporation of Ohio Application September 15, 1943, Serial No. 502,708

12 Claims. (Cl. 90—21.5)

This invention relates to milling machines and more particularly to improvements in automatic cyclic mechanisms for such machines.

One of the objects of this invention is to provide an improved automatic milling machine for cutting or forming radial tapered grooves.

Another object of this invention is to provide an improved machine for the purposes disclosed which is efficient, time-saving and practical.

Another object of this invention is to provide an improved automatic machine which will cut or form a longitudinal tapered groove or indentation in a single pass between the cutter and work.

A further object of this invention is to provide an improved and compact mechanism for automatically effecting the required relative movements between the tool and work to form a series of radial tapered grooves in automatic succession.

An additional object of this invention is to provide an improved and combined table oscillating and indexing mechanism.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

Figure 1:
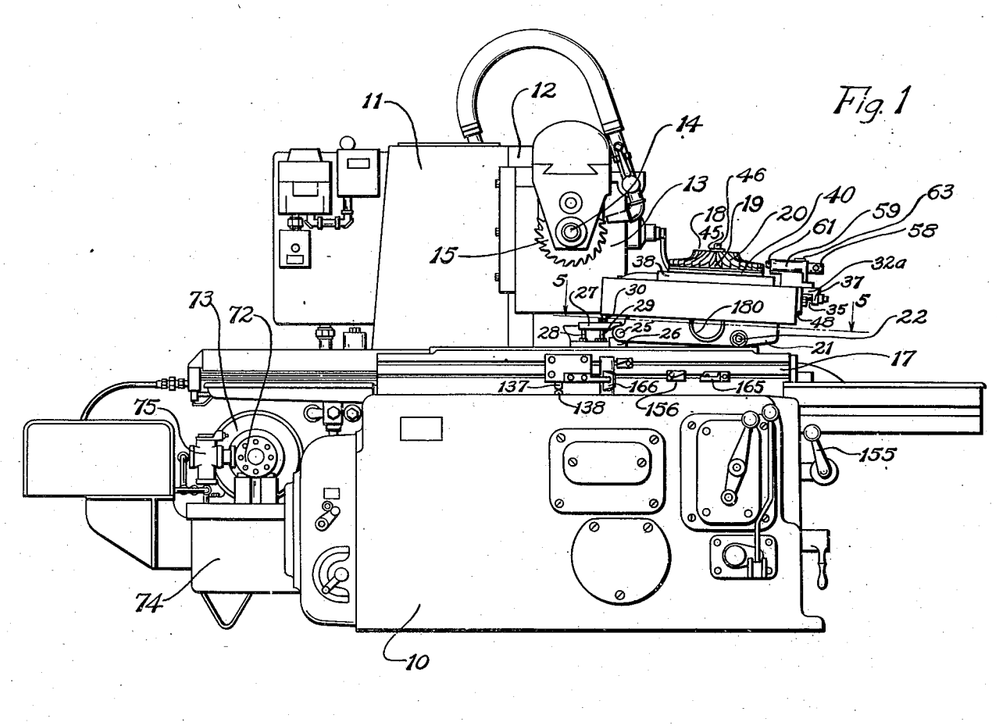
Figure 1 is an elevational view of a machine embodying the principles of this invention.

Referring to Figure 1 of the drawings the reference numeral 10 indicates the bed of a machine from the back of which uprises a column 11 having suitably formed guideways 12 for receiving a vertically adjustable spindle carrier 13. A cutter spindle 14 is journaled in the carrier for power rotating a cutter 15.

Figure 4:
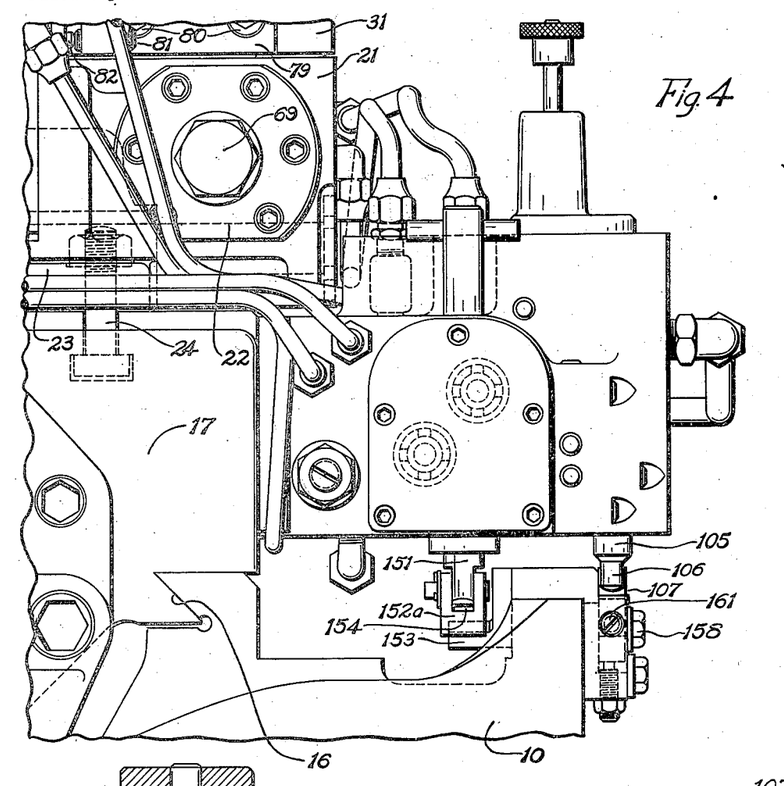
Figure 4 is a partial end view as viewed from the right of Figure 2 showing certain automatic trip controls.

The top of the bed is provided with a dovetailed guideway 16 which is partially shown in Figure 4 on which a table 17 is reciprocably mounted.

The table may be reciprocated by any suitable form of transmission which will impart an automatic reciprocating cycle to the table including rapid advance, feed and rapid return; the mechanism shown in copending application Serial No. 483,686, filed April 19, 1943, now Patent No. 2,422,414, issued June 17, 1947, being suitable for this purpose. Since the particular mechanism for reciprocating the table forms no part of the present invention, further description thereof is not believed to be necessary.

Figure 2:
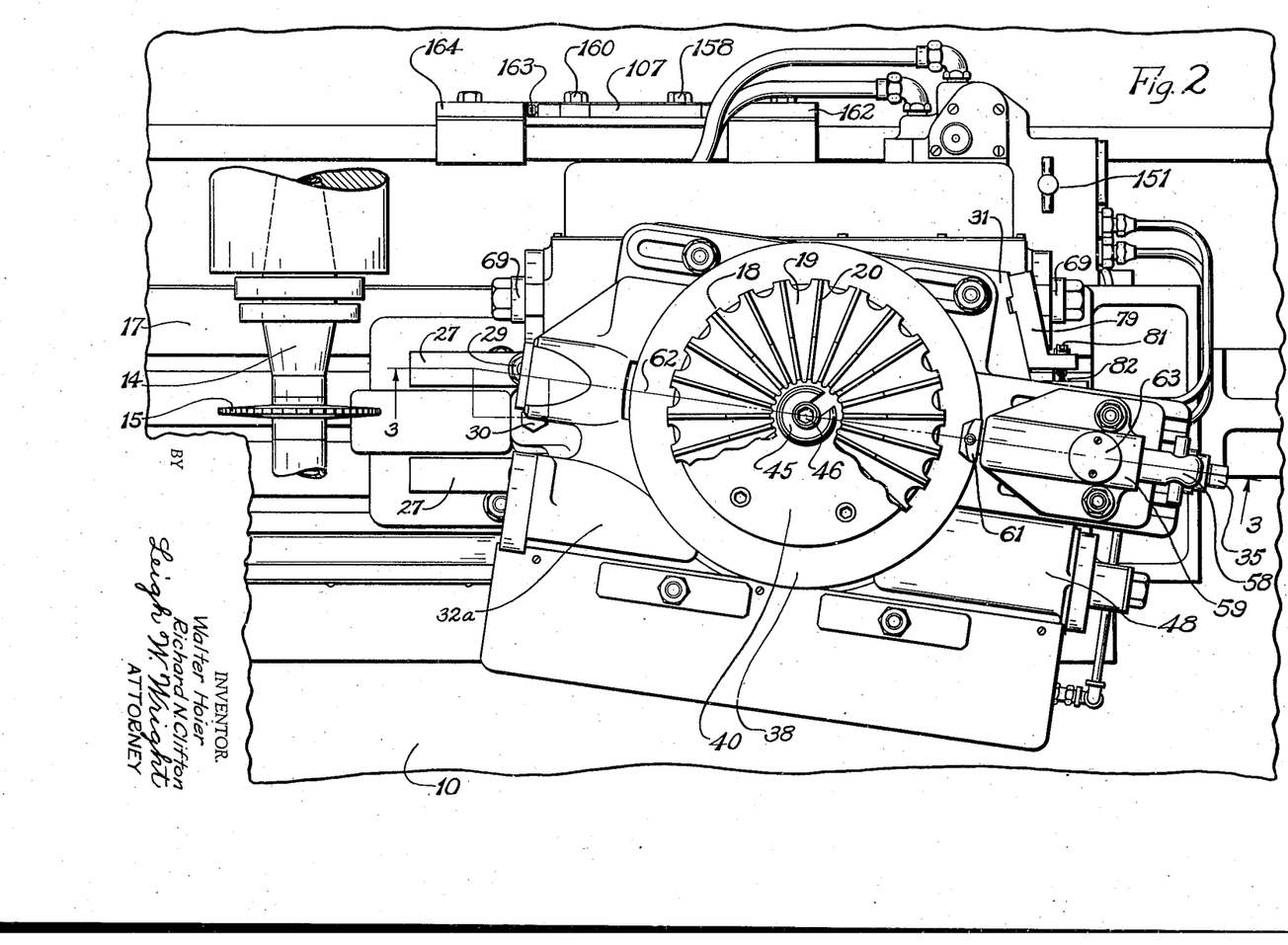
Figure 2 is a plan view of the work supporting fixture shown in Figure 1.

This machine is intended more particularly for cutting tapered grooves or spaces in a work piece and an exemplary work piece to which this machine is particularly adapted for milling is indicated by the reference numeral 18 in Figure 2. From this figure it will be noted that the work piece is circular and that there are a number of radial tapered grooves 19 which when formed provide a series of upstanding vanes 20.

In the past it has been the practice to form a groove by a series of successive passes between the tool and work and effecting a slight indexing movement between each pass. By means of this invention, the tapered groove is formed during a single pass between the cutter and work. This is accomplished by oscillating the work piece at a comparatively rapid rate during the longitudinal or feeding movement.

Figure 3:
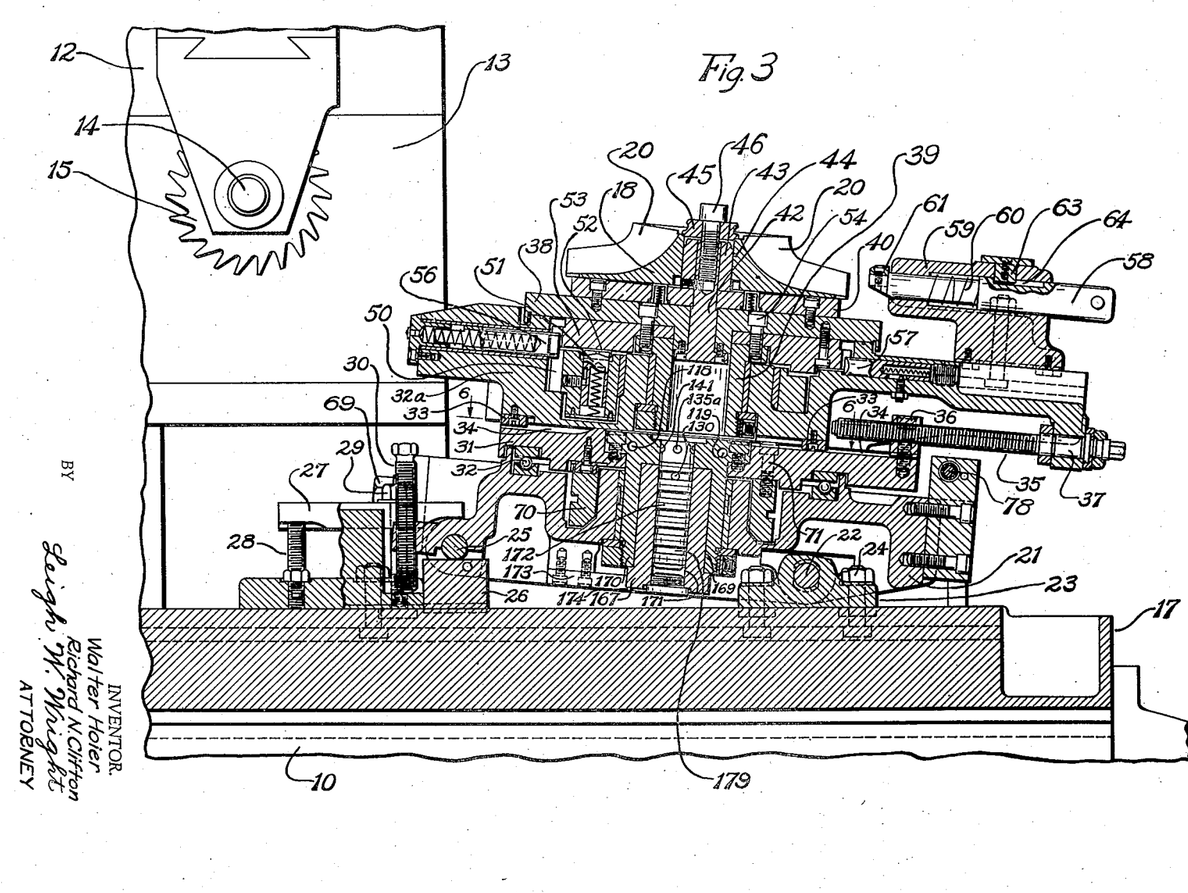
Figure 3 is a section on the line 3—3 of Figure 2.

Referring to Figure 3, the work supporting fixture comprises a base member 21 which is pivotally supported at one end on a pintle 22 mounted in a pintle block 23 which is secured to the table by bolts 24. This provides a pivotal connection whereby the entire fixture may be angularly adjusted relative to the plane of the table 17. The other end of the fixture is provided with a rod 25 which is adapted to rest on a sine block 26, the sine block being interchangeable to provide different heights in accordance with the angle of inclination which is desired for the fixture. The fixture and block are clamped to the table by a pair of clamping members 27 which are supported at one end on adjustable screws 28 and held down by clamping bolts 29. An adjustable screw 30 is threaded in the end of the fixture for supporting the fixture during changes in the sine block.

An oscillatable table 31 is supported by antifriction bearings 32 for rotation on the base member 21. The table 31 carries a support 32a for an indexible table. The support 32a is guided for longitudinal movement by blocks 33 which ride in a rectangular guideway 34. The adjustment is effected by a screw 35 which is threaded in a nut 36 that is attached to the table 31, the screw being journaled at 37 in the projecting end of the index support 32a. An indexible table 38 is journaled by means of a depending pintle 39 in the support 32a and carries a work supporting platen 40 upon which a work piece indicated by the numeral 18 is attached. The attaching means comprises an upstanding rod 42 upon which is mounted a bushing 43 which is of proper size to suit the bore 44 in the work piece. A work clamping washer 45 and clamping bolt 46 are provided for securing the work to the platen 40.

Figure 15:
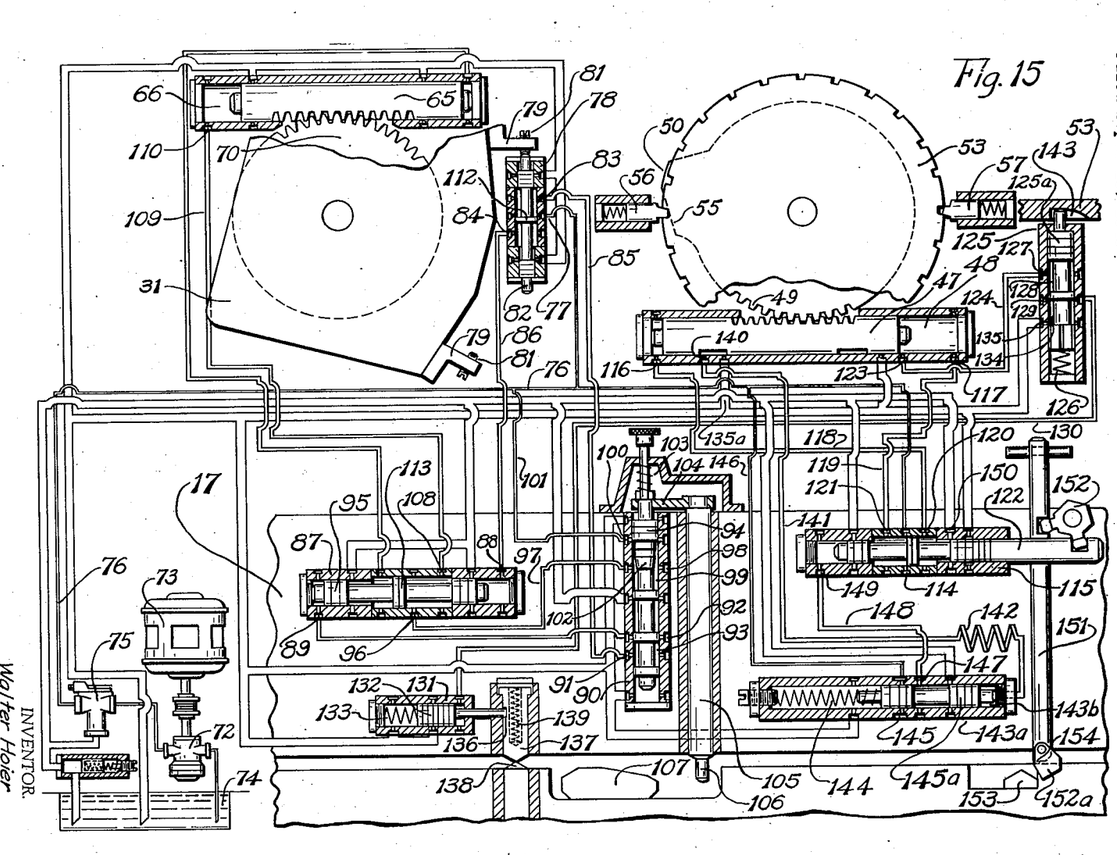
Figure 15 is a diagrammatic view of the hydraulic control circuit.

The indexible table 38 is indexed during each return stroke of the table 17 and this indexing movement is effected by a rack piston 47 which is slidably mounted in a cylinder 48 formed in the support 32a. As shown in Figure 15 the rack piston 47 engages with gear teeth 49 of a ratcheting member 50 supported for rotation on the member 32a. The ratchet plate 50 carries a spring pressed ratchet plunger 51 which is adapted to engage ratchet teeth 52 formed on the underside of the detent plate 53 which is secured by bolts 54 to the indexible table 38. As the member 50 rotates counterclockwise, as viewed in Figure 15, the cam surface 55 effects withdrawal of a locking plunger 56 while the hold-back plunger 57 prevents rotation of the table 38. When the piston 47 reverses and moves to the left, the table 38 and connected plate 53 rotate in a clockwise direction to a new indexed position.

Since the index table has a series of definite positions, it is necessary to position the work on the table in a definite manner, especially if the work comes to the machine with the ribs partially cast whereby the function of the machine is to remove the material between the partially formed ribs. This is readily accomplished by providing a work positioning plunger 58 which is slidably mounted in a support 59 attached to the end of the base member 32a and this plunger is normally held in a retracted position by a spring 60.

The end of the plunger is provided with a work locating member 61 which is beveled on opposite sides as shown in Figure 2 so that it may be projected forward until it engages between a pair of vanes 20, thereby centralizing the vane relative to the center line of operation 62 indicated in Figure 2, of the drawings. The plunger 58 is held against rotation by a key 63 which engages a suitably formed slot 64 formed on the upper surface of the plunger 58.

Figure 5:
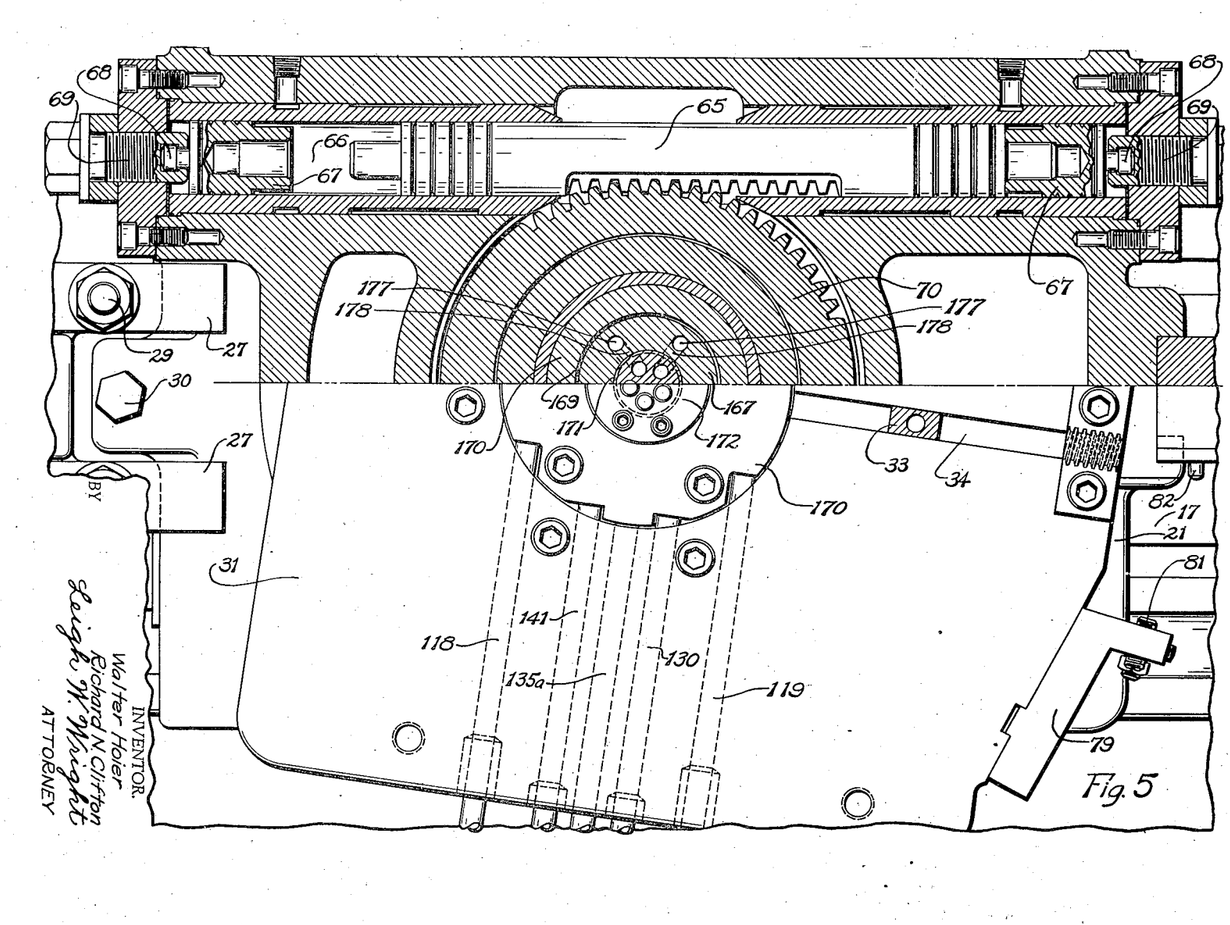
Figure 5 is a partial sectional view as viewed on the line 5—5 of Figure 1.

After the work has been suitably indexed the table 31 is oscillated at a rather fast rate during the rectilinear feeding of the table 17. This is effected by a second rack piston 65 which is slidably mounted in a cylinder 66 which is more particularly shown in Figure 5. Due to the rather fast rate of oscillation, it is necessary to prevent pounding of the parts, and therefore, means have been provided in opposite ends of the cylinder to cushion the stroke of the piston. This means comprises a pair of adjustable dashpot members 67 which are connected by headed bolts 68 to adjusting screws 69 which pass through the cylinder heads for adjustment from the outside. These not only cushion the stroke of the piston but also determine the length of the stroke. The rack piston 65 engages a gear member 70 which as shown in Figure 3 is secured to the underside of the table 31 by bolts 71.

The rack pistons are automatically actuated in accordance with reciprocation of the table 17. The hydraulic circuit for controlling the flow of fluid pressure to these pistons is shown in Figure 15. Fluid pressure is supplied to this circuit by a pump 72 which is driven by an electric motor 73 mounted on top of a tank 74 which is attached to the end of the bed 10 of the machine as shown in Figure 1 of the drawings. The fluid is withdrawn from the tank or reservoir 74 and forced through a relief valve 75 to a pressure supply channel 76.

Figure 11:
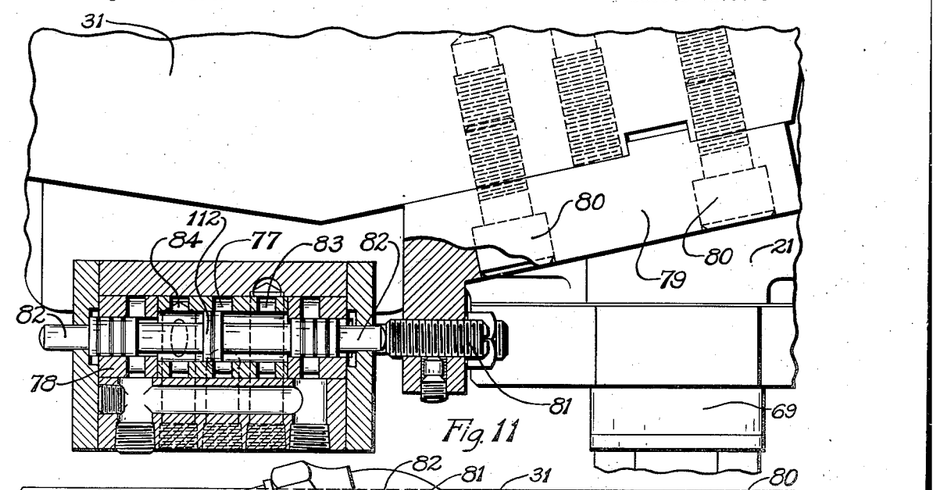
Figure 11 is a section on the line 11—11 of Figure 10.

The channel 76 has a branch connection to pressure port 77 of a pilot valve 78 which controls automatic reversal of the oscillating table 31. As shown in Figure 11 this table has a bracket 79 secured thereto as by bolts 80 and in the end of this bracket is an adjustable dog screw 81 which is positioned to engage the end of the pilot valve plunger 82.

The pilot valve has a pair of ports 83 and 84 which are connected by channels 85 and 86 to opposite ends of a reversing valve 87. The channel 86 is directly connected to port 88 located in one end of the reversing valve housing 87 while the other channel is connected to the port 89 through an intermediate control valve 90. This valve has a pair of ports 91 and 92 which are adapted to be interconnected by an annular groove 93 in the control valve plunger 94. When this valve is raised as viewed in Figure 15, pressure in channel 85 will flow through the annular groove 93 to the port 89 and shift the reversing valve plunger 95 to the right. The reversing valve 87 has a pressure port 96 which is connected to the main supply line 76, but through the control valve 94.

In other words, the port 96 is connected by channel 97 to port 98 and this port is adapted to be connected by an annular groove 99 to port 100 which has a branch 101 leading to line 76. It will be obvious that the rate of oscillation of the table 31 may be controlled by controlling the rate of flow to the cylinder 66. To this end the valve plunger 94 has a throttling portion 102 formed thereon which is adjustable relative to the port 100, and this plunger is normally urged downward by a spring 103 which tends to move the plunger to a port closing position. The plunger is connected by an arm 104 to a rod 105 which carries a follower 106 which is adapted to ride a rate control cam 107. The cam 107 is carried by the bed of the machine as more particularly shown in Figure 8.

When the valve plunger 94 is in the position shown in Figure 15 the port 100 is nearly closed but sufficient fluid may still pass through the port to maintain the lines full of oil under a low pressure and thereby prevent air from creeping into the system.

Furthermore, when the plunger is down the port 92 is closed which will prevent oil flowing from channel 85 to port 89 of the reversing valve whereby the reversing valve will not be actuated when the pilot valve is moved into the position shown in Figure 15. The port 96 will remain connected to port 108 and since the latter is connected by channel 109 to port 110 located in the left end of cylinder 66, the plunger 65 will be moved to the position in which it is shown in Figure 15 and held in that position by the pressure in channel 109. As the table 17 advances, or in other words, moves to the left as shown in Figure 15, the cam 107 will raise the follower 106 and thereby the control valve 94, which will interconnect port 91 with port 92, thereby shifting the reversing valve plunger 95 and starting reciprocation of the oscillating table 31. As the table 31 moves in a counterclockwise direction it will shift the pilot valve plunger and interconnect pressure port 77 with port 84, thereby causing a shifting of the reversing valve plunger 95 to the left, interconnecting ports 96 and 108 and effect clockwise movement of the table 31. It will be noted that the pilot valve plunger has an enlarged central spool 112 whereby the valve will automatically fire as it passes through the central position and also the reversing valve 95 has an enlarged central spool 113 to insure that the plunger automatically completes its shifting movement after it passes the center position so that neither of these valves will have a tendency to hold up in a partially fired position.

The supply channel 76 is also connected to a port 114 of a reversing valve 115 for the indexing piston 47. The opposite ends of cylinder 48 have ports 116 and 117 which are connected by channels 118 and 119 to ports 120 and 121 of valve 115. When the plunger 122 is to the right as shown the port 114 is connected to port 121 whereby fluid pressure will flow to the right end of cylinder 48 and when the plunger 122 is shifted to the left, port 114 is connected to port 120 and fluid pressure will flow to the other end of cylinder 48.

When the plunger 47 shifts to the left, it uncovers a port 123 which is connected by channel 124 to an automatic stop valve 125.

This stop valve is located underneath the plate 53 and is normally held in a depressed position by the plate against the resistance of a spring 126 so that the port 127 is connected by an annular groove 128 to a port 129. This port has a channel 130 which leads to a cylinder 131 that has a contained plunger 132. Pressure will normally hold the plunger 132 in a retracted position against the resistance of a spring 133. Upon completion of a full revolution of the table 38, which means that a work piece has been completed, a depression 143 formed in the underside of the plate 53, which is integral with the table, will move into position permitting the plunger 125a to move up under the urge of spring 126 and thereby disconnect port 127 from port 129. The latter, however, will be connected by means of an annular groove 134 to exhaust port 135, thus relieving the pressure in cylinder 131 so that the plunger 132 will move toward the right under the urge of spring 133.

The purpose of this is to stop reciprocation of the main table 17 of the machine and this is accomplished by the plunger 132 which has a reduced end which is adapted to move into a slot 136 formed in the side of a stop dog 137. This dog is in position to engage a stop plunger 138 mounted on the machine bed, and depression of plunger 138 will automatically stop the machine. Normally, however, the plunger 132 is held in a retracted position by fluid pressure and the dog 137 is free to move upward against the resistance of a light spring 139. Thus, after a full revolution of the indexible table the machine is automatically stopped.

When the reversing valve plunger 122 for the table indexing piston 47 moves to the left, pressure fluid is admitted to channel 118 which shifts the index plunger 47 to the right. Completion of this movement will uncover a port 140 whereby the fluid pressure which shifted the piston may continue through a channel 141 and choke coil 142 to the right hand end of a pilot valve 143a. The shifting of this pilot valve against the resistance of a spring 144 will interconnect a pressure port 145, to which a branch 146 from the main supply line 76 is connected, to a port 147. Fluid pressure can now flow through port 147 and channel 148 to port 149 and thereby shift the reversing valve plunger 122 to the right.

It should be obvious that, as soon as the plunger 122 is shifted to the right, the port 120 will be connected to an exhaust port 150 which immediately relieves the pressure in the left hand end of cylinder 48 and since the space at this end of the cylinder is connected through channel 141 to the pilot valve 143a the pilot valve plunger would return under the urge of spring 144, thereby disconnecting the pressure from channel 148 which pressure initiated the movement of plunger 122, and therefore in order to delay the return movement of plunger 145a and insure the complete shifting of plunger 122 the choke coil 142 is introduced in the line 141, thereby delaying the exhaust of fluid from cylinder 143b and thereby insuring complete shifting of plunger 122.

The plunger 122 is mechanically shifted in the opposite direction by a trip mechanism comprising a trip plunger 151 which is operatively connected by a bell crank 152 to the valve plunger 122. The plunger 151 carries a pawl 152a which is adapted to interengage with a fixed dog 153. The pawl is bifurcated as shown in Figure 4, while the end of the plunger is provided with a projection 154 whereby upon movement in one direction the pawl will be rotated without effecting movement of the plunger 151, but upon movement in the other direction the projection will prevent rotation of the pawl and the plunger will be elevated, thereby effecting shifting of the plunger 122.

It should be noted that as soon as the trip plunger 151 is actuated to shift the valve plunger 122 a complete cycle of operation will be effected by the piston 47. In other words, it will move from its starting position shown in Figure 15 to the right until it hits the end of the cylinder, at which time the port 140 becomes uncovered and the pilot valve is actuated, causing return of the valve plunger 122 to the position shown in Figure 15 whereby pressure will now flow to the right hand end of cylinder 48, thereby returning the piston 47 to its starting position and simultaneously connecting pressure to channel 124. The pressure in this channel will only be effective as previously explained after the work supporting table has made a complete rotation, at which time the reciprocation of the table will be stopped.

Figures 8, 9:
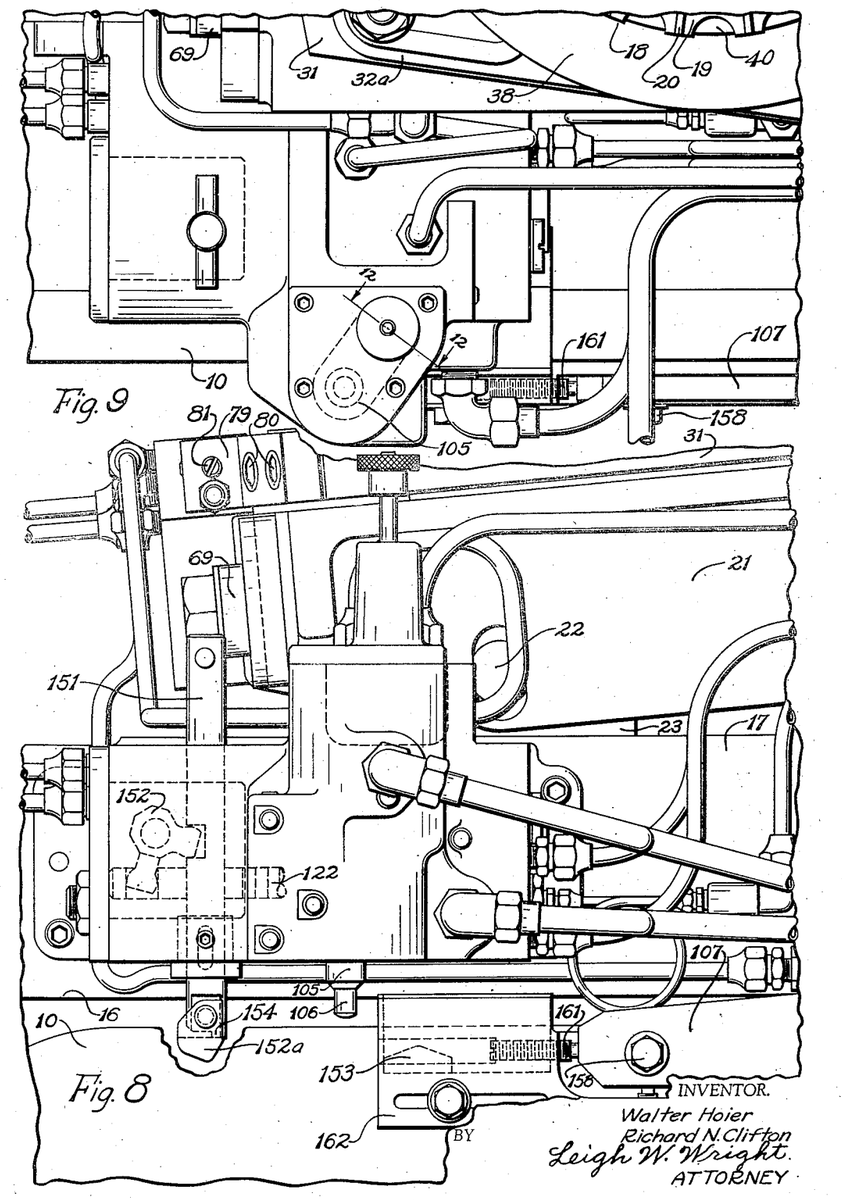
Figure 8 is a detail elevational view of the trip control mechanism for the oscillating and indexing fixture.
Figure 9 is a plan view of the parts shown in Figure 8.
Figure 10:
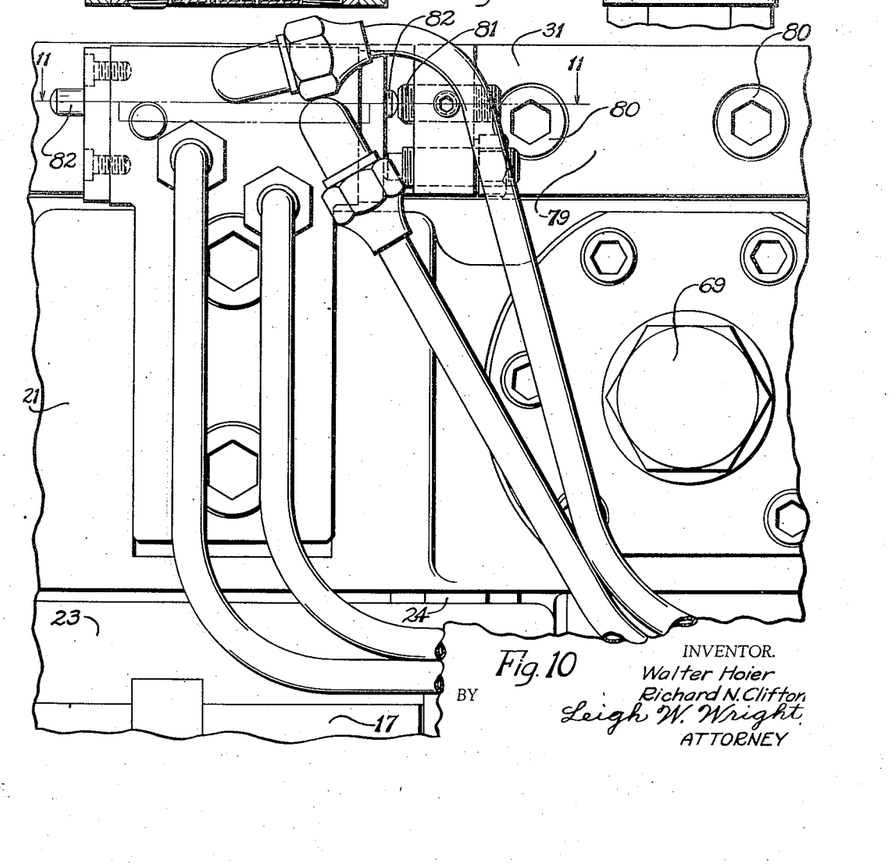
Figure 10 is a partial end view of the fixture showing the trip control pilot valve.
Figures 12, 13, 14:
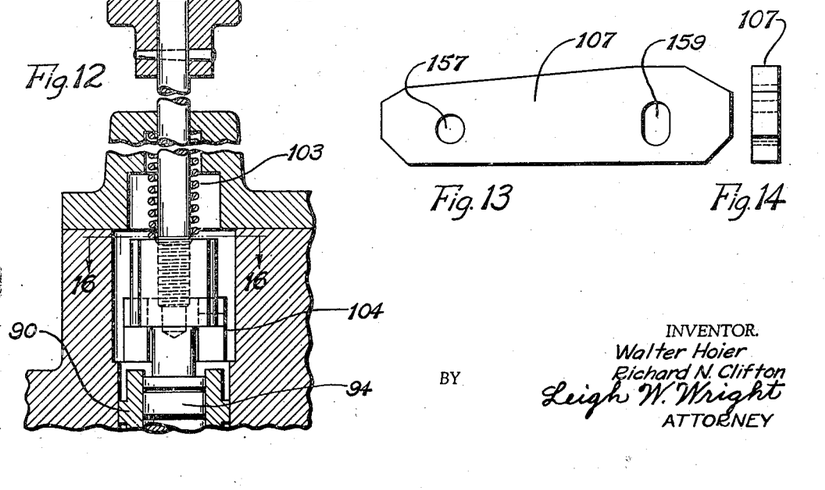
Figure 12 is a section on the line 12—12 of Figure 9.
Figure 13 is a detail view of the oscillation rate control cam.
Figure 14 is an end view of the cam as viewed from the right of Figure 13.

In the cycle of operation of the machine the operator throws the control lever 155 which starts the table moving toward the left as viewed in Figure 1 at a rapid traverse rate to move the work piece up to the cutter, and then a dog 156 automatically changes this rate to a feed rate. At the same time the plunger 106, as shown in Figure 8, engages the cam 107 which thereby raises the rate control valve plunger 94 causing oscillation of the support 31. This cam which is shown in detail in Figure 13 is angularly adjustable to vary the rate of oscillation and to this end is provided with a hole 157 by which it is fastened by a bolt 158, shown in Figure 8, to the rear side of the bed 10 as shown in Figure 4, and this bolt may be loosened to permit angular adjustment of the cam.

The cam is also provided with a slotted hole 159 through which passes a second bolt 160 for securing the other end of the cam to the bed. To prevent shifting of the cam, a lock screw 161 is threaded in a plate 162 at one end and a screw 163 which is threaded in a plate 164 at the other end.

The support 31 will continue to oscillate during the feeding movement until reversing dog 165 rotates the trip control plunger 166 whereupon the table 17 will return at a rapid rate. During this return movement the index plunger 151 will be trip actuated, thereby indexing the support 38. The table 17 again reverses and repeats the cycle.

At the end of each cycle, the dog 137 ineffectively engages plunger 138, but after a complete rotation of the indexible table, the dog is rendered effective and stops the table 17.

Figure 6:
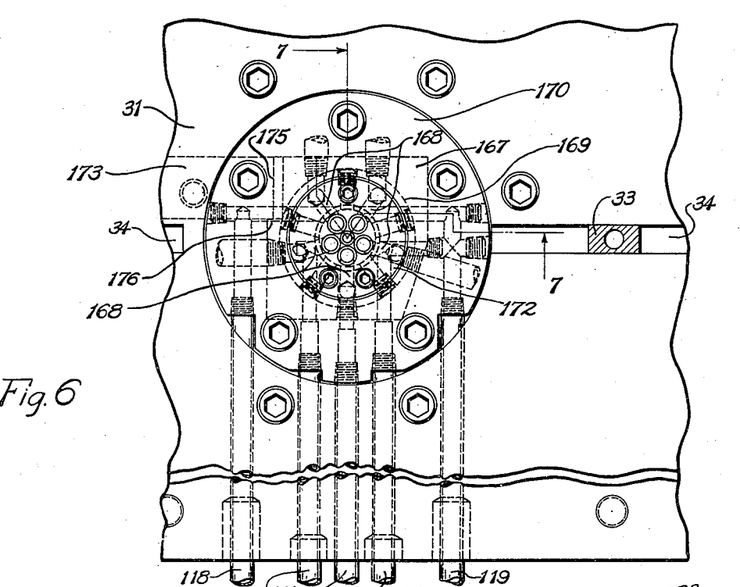
Figure 6 is a plan view of the pintle as viewed on the line 6—6 of Figure 3.
Figures 7, 16:
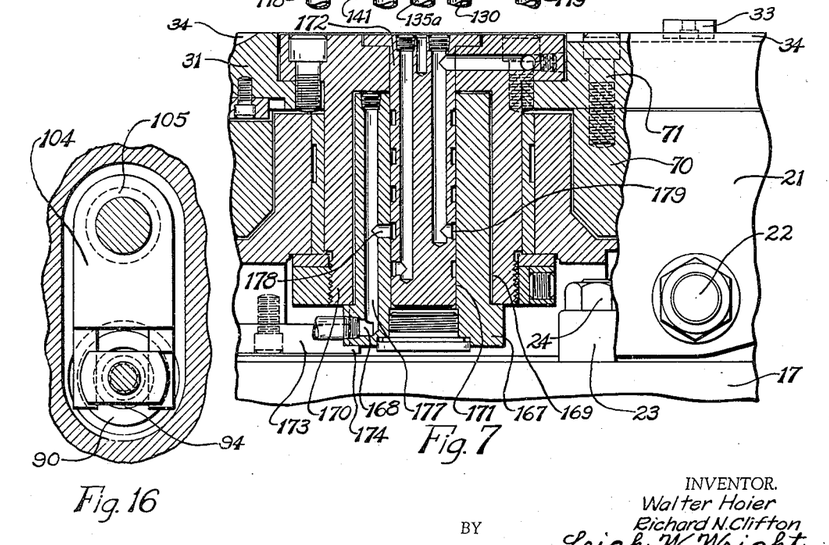
Figure 7 is a section as viewed on the line 7—7 of Figure 6.
Figure 16 is a section on the line 16—16 of Figure 12.

It is to be understood that the various hydraulic connections are made flexible wherever it is necessary. As shown in Figures 3, 6 and 7, however, a multiple swivel connection is provided in order to conduct fluid through the oscillating table to the index mechanism. This connection comprises a shouldered sleeve 167 having a series of circumferentially spaced ports, one of which is indicated at 168, there being a port for each of channels 118, 141, 130, and 119 which lead to the index cylinder 48 and control valve 125, and one also for the exhaust or return channel 135a.

The sleeve 167 fits in a bore 169 formed in the portion 170 of the oscillatable table 31, and in turn, has a bore 171 in which fits a multiple grooved cylindrical member 172 which depends from the under side of the table 31. Thus, the members 170 and 172 on the outside and inside of sleeve 167 rotate with the table 31, while the sleeve is held stationary by a block 173, Figure 7, which has a lower lip 174 which fits under the sleeve and holds it axially in position, and an end portion 175, shown in Figure 6, which engages a notch 176 formed on the end of the sleeve for preventing rotation thereof.

Each port 168 communicates with a bore 177 which has a radial port 178 that registers with one of the annular grooves 179. Each groove connects with an axially extending bore from which radiate the interdrilled connections for each channel as shown in Figure 6. The ends of these channels are connected by a coil of pipe, one of which is shown at 180 in Figure 1 to the proper ports as indicated on the diagram in Figure 15.

There has thus been provided an improved machine for shaping tapered grooves in a work piece by one continuous feeding movement between cutter and work by automatically effecting a fast oscillation of the work support during the advancing movement, together with means for indexing the work relative to the oscillating support whereby a succession of such surfaces may be formed automatically around the periphery of the work and means for automatically stopping the machine when a work piece has been completed.

What is claimed is:

1. In a milling machine having a rotatable cutter and a reciprocable table, the combination of means for supporting a work piece on the table including an oscillatable support and a superimposed indexible support, fluid operable means carried by the table for effecting the oscillation and the indexing respectively, and trip operable valve means for connecting fluid pressure to each of said means in a sequential manner.

2. In a milling machine having a rotatable cutter and a reciprocable table, the combination of means for supporting a work piece on the table including a base member, an oscillatable sub-support and a superimposed indexible support, means trip operable during advance of the table to cause oscillation of the sub-support, and additional means trip operable during return movement of the table to effect operation of said indexible support.

3. In a milling machine having a cutter, a reciprocable table, the combination of means for supporting a work piece on the table for oscillatory movement during rectilinear advance of the table including fluid operable means to effect said oscillation, a reversing valve, a throttle valve having a source of pressure connected thereto, and cam operated means for opening said throttle valve during advance of the table, and for closing said valved uring return movement of the table.

4. In a milling machine having a rotary cutter and a reciprocating table, the combination of means mounted on the table for oscillatably supporting a work piece during advancing movement of the table relative to the cutter including fluid operable means to effect said oscillation, a reversing valve, a pilot valve for controlling shifting of the reversing valve, and means trip operable by the table for disconnecting the pilot valve from the reversing valve to stop said oscillation.

5. In a milling machine having a cutter support and a work support movable relative thereto, the combination of an oscillatable support mounted on the work support, means to control said oscillation including a fluid operable motor, a reversing valve therefor, a source of pressure, a pilot valve trip operable by the oscillating support to connect said source for shifting said reversing valve, a throttle valve for connecting said source of pressure to the reversing valve during advance of the work support, and means in the throttle valve for disconnecting the source of pressure from said reversing valve and simultaneously disconnecting said pilot valve from said reversing valve during return of the work support.

6. In a milling machine having a rotating cutter and a reciprocable table, the combination of means for supporting a work piece for oscillatory movement during feeding movement of the table including a base member mounted on the table and having a piston and cylinder contained therein, an oscillatable support mounted on the base member and operatively connected to said piston, a reversing valve for the piston, a pilot valve having a source of pressure connected thereto and trip operable by the oscillating member for effecting shifting of the reversing valve, channels connecting the pilot valve to the reversing valve, and trip operable valve means for opening and closing one of said channels to control the starting and stopping of said oscillation.

7. In a milling machine having a rotary cutter and a reciprocating table, the combination of means for supporting a work piece on the table for oscillatory movement relative to the cutter including an oscillatable support, a fluid operable control mechanism for effecting said oscillation including a throttle valve having a source of pressure connected thereto, trip operable means for opening said throttle valve including a cam, said cam being formed to uniformly increase the opening of said throttle valve as the table advances and thereby increase the rate of oscillation as the cutter approaches the axis of oscillation of the work.

8. In a milling machine having a rotating cutter and a reciprocating table, the combination of a fluid oscillatable work support mounted on the table, a throttle valve for connecting a source of pressure to said fluid oscillating means, a plunger carried by the table for actuating said throttle valve, a cam mounted on the bed for engaging said plunger, and means to adjust the angularity of the cam to vary the rate of acceleration of said oscillatory movement during a predetermined advance of the table.

9. In a milling machine having a rotating cutter and a reciprocating table, the combination of a work supporting fixture mounted on the table including a base member, an oscillatable support anti-frictionally supported on the base member, means to adjust the angularity of the base member relative to the plane of the table, a work supporting platen mounted on the oscillatable support, means to effect a relative adjustment between the platen and the oscillatable support to vary the relation between the index axis and the oscillatory axis, fluid operable devices to effect said oscillation and said indexing, trip plungers carried by the table for initiating actuation of each, and means operable by the indexing table to stop the work table.

10. In a milling machine having a rotating cutter and a reciprocating table, the combination of a work supporting fixture mounted on the table including a base member, an oscillatable support anti-frictionally supported on the base member, means to adjust the angularity of the base member relative to the plane of the table, a work supporting platen mounted on the oscillatable support, and means to effect a relative adjustment between the platen and the oscillatable support to vary the relation between the index and the oscillatory axis.

11. In a milling machine having a cutter support and a reciprocatable work support, the combination of an oscillatable table mounted on the work support, said support being movable at a rapid traverse rate to advance the table to the cutter and at a feeding rate to effect machining of the work, means trip operable during movement of the support at the feed rate to initiate oscillation of the table, means to determine the amplitude of said oscillation and additional means independent of the feed rate to vary the rate of oscillations of a determined amplitude.

12. In a milling machine having a cutter support and a reciprocatable work support, the combination of an oscillatable table mounted on the work support, said support being movable at a rapid traverse rate to advance the table to the cutter and at a feeding rate to effect machining of the work, means trip operable during movement of the support at the feed rate to initiate oscillation of the table, power means to vary the rate of said oscillation during a constant feed rate machining operation, and additional independently adjustable means to vary the angle of oscillation of the table.

WALTER HOIER.
RICHARD N. CLIFTON.

REFERENCES CITED

The following references are of record in the file of this patent:

UNITED STATES PATENTS

| Number | Name | Date |
| --- | --- | --- |
| 502,257 | Jones | July 25, 1893 |
| 529,013 | Barnes | Nov. 13, 1894 |
| 602,884 | Urban | Apr. 26, 1898 |
| 1,775,184 | Abbott | Sept. 9, 1930 |
| 1,799,608 | Tscherne | Apr. 7, 1931 |
| 2,007,827 | Fletcher | July 9, 1935 |
| 2,216,550 | Ernst | Oct. 1, 1940 |
| 2,261,052 | Coffin et al. | Oct. 28, 1941 |
| 2,359,601 | Andrew et al. | Oct. 3, 1944 |

FOREIGN PATENTS

| Number | Country | Date |
| --- | --- | --- |
| 285,642 | Great Britain | Feb. 23, 1928 |
| 402,211 | Germany | Sept. 15, 1924 |